(12) United States Patent
Lee et al.

(10) Patent No.: US 10,365,497 B2
(45) Date of Patent: Jul. 30, 2019

(54) BACKLIGHT UNIT AND AUTOSTEREOSCOPIC 3D DISPLAY DEVICE INCLUDING THE SAME

(71) Applicant: LG Display Co., Ltd., Seoul (KR)

(72) Inventors: ChangHo Lee, Paju-si (KR); SeongHwan Ju, Paju-si (KR); YoonSung Tak, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 90 days.

(21) Appl. No.: 15/384,873

(22) Filed: Dec. 20, 2016

(65) Prior Publication Data

US 2017/0184868 A1 Jun. 29, 2017

(30) Foreign Application Priority Data

Dec. 29, 2015 (KR) .......................... 10-2015-0188309

(51) Int. Cl.
*F21V 8/00* (2006.01)
*G02B 27/22* (2018.01)

(52) U.S. Cl.
CPC ......... *G02B 27/225* (2013.01); *G02B 6/0036* (2013.01); *G02B 6/0068* (2013.01); *G02B 6/0076* (2013.01)

(58) Field of Classification Search
CPC .. G02B 6/0036; G02B 6/0038; G02B 6/0058; G02B 6/0068; G02B 6/0076; G02B 27/225
See application file for complete search history.

(56) References Cited

U.S. PATENT DOCUMENTS

| | | | | |
|---|---|---|---|---|
| 2006/0164862 A1* | 7/2006 | Chien | ................. | G02B 6/0038 362/619 |
| 2007/0109811 A1* | 5/2007 | Krijn | ................... | G02B 6/0056 362/619 |
| 2010/0014318 A1* | 1/2010 | Chi | ...................... | G02B 6/0036 362/620 |
| 2010/0118218 A1* | 5/2010 | Eichenlaub | ........ | G02B 27/2214 349/15 |
| 2010/0182534 A1* | 7/2010 | Usukura | .............. | G02B 3/0056 349/62 |
| 2010/0288614 A1 | 11/2010 | Ender | | |

(Continued)

FOREIGN PATENT DOCUMENTS

| | | |
|---|---|---|
| CN | 101796443 A | 8/2010 |
| CN | 102313203 A | 1/2012 |

(Continued)

*Primary Examiner* — Zheng Song
(74) *Attorney, Agent, or Firm* — Birch, Stewart, Kolasch & Birch, LLP

(57) ABSTRACT

Discussed are a backlight unit and an autostereoscopic 3D (three-dimensional) display device including the same, in which a 3D image can be displayed without using a 3D light controller that includes a liquid crystal layer. The backlight unit may include a 3D light guide plate having first light output patterns, first light sources irradiating light to at least one side of the 3D light guide plate, a 2D (two-dimensional) light guide plate arranged below the 3D light guide plate, and second light sources irradiating light to at least one side of the 2D light guide plate. The first light output patterns are a plurality of line prism patterns spaced apart from each other.

19 Claims, 13 Drawing Sheets

(56) References Cited

U.S. PATENT DOCUMENTS

| | | | |
|---|---|---|---|
| 2012/0002444 A1 | 1/2012 | Kim et al. | |
| 2012/0032997 A1* | 2/2012 | Cha | G02B 6/0076 345/690 |
| 2012/0075698 A1 | 3/2012 | Minami | |
| 2012/0134177 A1 | 5/2012 | Kim et al. | |
| 2013/0120474 A1* | 5/2013 | Suzuki | G02B 6/0036 345/690 |
| 2013/0229828 A1* | 9/2013 | Chen | G02B 6/0076 362/616 |
| 2013/0250427 A1 | 9/2013 | Lee et al. | |
| 2014/0146271 A1* | 5/2014 | Hung | G02B 6/0011 349/62 |
| 2014/0301108 A1* | 10/2014 | Mineura | H04N 5/66 362/615 |
| 2014/0355113 A1* | 12/2014 | Pan | G02B 27/2214 359/462 |
| 2017/0108636 A1* | 4/2017 | Yoon | G02B 6/0038 |
| 2017/0153379 A1* | 6/2017 | Chang | G02B 6/0081 |
| 2017/0168452 A1* | 6/2017 | Matsuo | G03H 1/2286 |

FOREIGN PATENT DOCUMENTS

| | | |
|---|---|---|
| CN | 102478683 A | 5/2012 |
| CN | 102563401 A | 7/2012 |
| CN | 104181697 A | 12/2014 |
| TW | 200921165 A | 5/2009 |
| TW | 201218179 A1 | 5/2012 |
| TW | 201430391 A | 8/2014 |

* cited by examiner

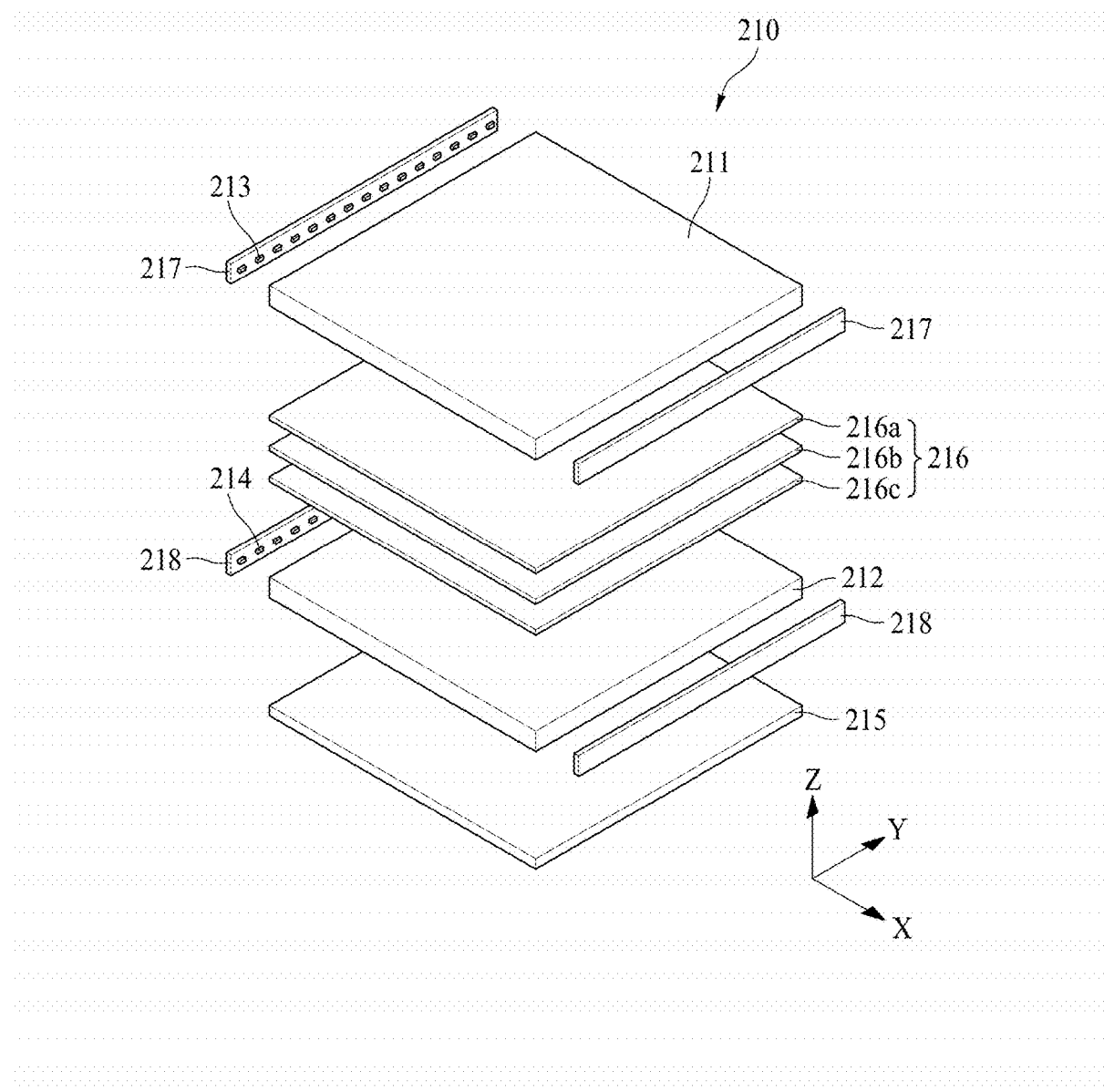

BACKLIGHT UNIT AND AUTOSTEREOSCOPIC 3D DISPLAY DEVICE INCLUDING THE SAME

CROSS REFERENCE TO RELATED APPLICATIONS

This application claims the priority benefit of the Korean Patent Application No. 10-2015-0188309 filed on Dec. 29, 2015, which is hereby incorporated by reference for all purposes as if fully set forth herein.

BACKGROUND OF THE INVENTION

Field of the Invention

The present invention relates to a backlight unit and an autostereoscopic 3D display device including the same.

Discussion of the Related Art 3D-image display devices for displaying 3D image (or stereopsis image) are categorized into a stereoscopic 3D (three dimensional) display technique and an autostereoscopic 3D display technique. Recently, the two techniques have been commercialized. The stereoscopic 3D display technique is categorized into a polarizing stereoscopic 3D display technique and a shutter stereoscopic 3D display technique. The polarizing stereoscopic 3D display technique switchably displays polarized light of a left and right parallax image on a direct viewing type display device or a projector and displays a 3D image by using polarizing glasses. The shutter stereoscopic 3D display technique displays a left and right parallax image through time division and displays a 3D image by using shutter glasses.

The autostereoscopic 3D display technique displays a 3D image by forming a viewing zone at an optimal viewing distance by properly controlling light from pixels of a display panel. The viewing zone may include 'x' number of views ('x' is an integer of 2 or more).

The autostereoscopic 3D display technique requires a 3D light controller, such as a switchable barrier and a switchable lens, which controls light from pixels of a display panel by using a liquid crystal layer. The switchable barrier displays a 2D (two dimensional) image in a 2D mode and a 3D image in a 3D mode by transmitting light from pixels of a display panel in a 2D mode as it is by using a liquid crystal layer and partially shielding the light from the pixels of the display panel in the 3D mode. The switchable lens displays a 2D image in a 2D mode and a 3D image in a 3D mode by transmitting light from pixels of a display panel in a 2D mode as it is by using a liquid crystal layer and refracting the light from the pixels of the display panel like a lens in the 3D mode. However, the 3D light controller such as the switchable barrier and the switchable lens has a problem in that the manufacturing cost is high due to the liquid crystal layer.

SUMMARY OF THE INVENTION

Accordingly, the present invention is directed to a backlight unit and an autostereoscopic 3D display device including the same that substantially obviates one or more problems due to limitations and disadvantages of the related art.

An advantage of the present invention is to provide a backlight unit and an autostereoscopic 3D display device including the same, in which a 3D image can be displayed without using a 3D light controller that includes a liquid crystal layer.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit according to an embodiment of the present invention comprises a 3D light guide plate including first light output patterns, first light sources irradiating light to at least one side of the 3D light guide plate, a 2D light guide plate arranged below the 3D light guide plate, and second light sources irradiating light to at least one side of the 2D light guide plate. The first light output patterns are a plurality of line prism patterns spaced apart from each other.

In another aspect of the present invention, an autostereoscopic 3D display device comprises a display panel, and a backlight unit irradiating light to the display panel, wherein the backlight unit includes a 3D light guide plate including first light output patterns, first light sources irradiating light to at least one side of the 3D light guide plate, a 2D light guide plate arranged below the 3D light guide plate, and second light sources irradiating light to at least one side of the 2D light guide plate. The first light output patterns are a plurality of line prism patterns spaced apart from each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exemplary view illustrating a backlight unit of FIG. 1;

DETAILED DESCRIPTION OF THE EMBODIMENTS

Figure 1:
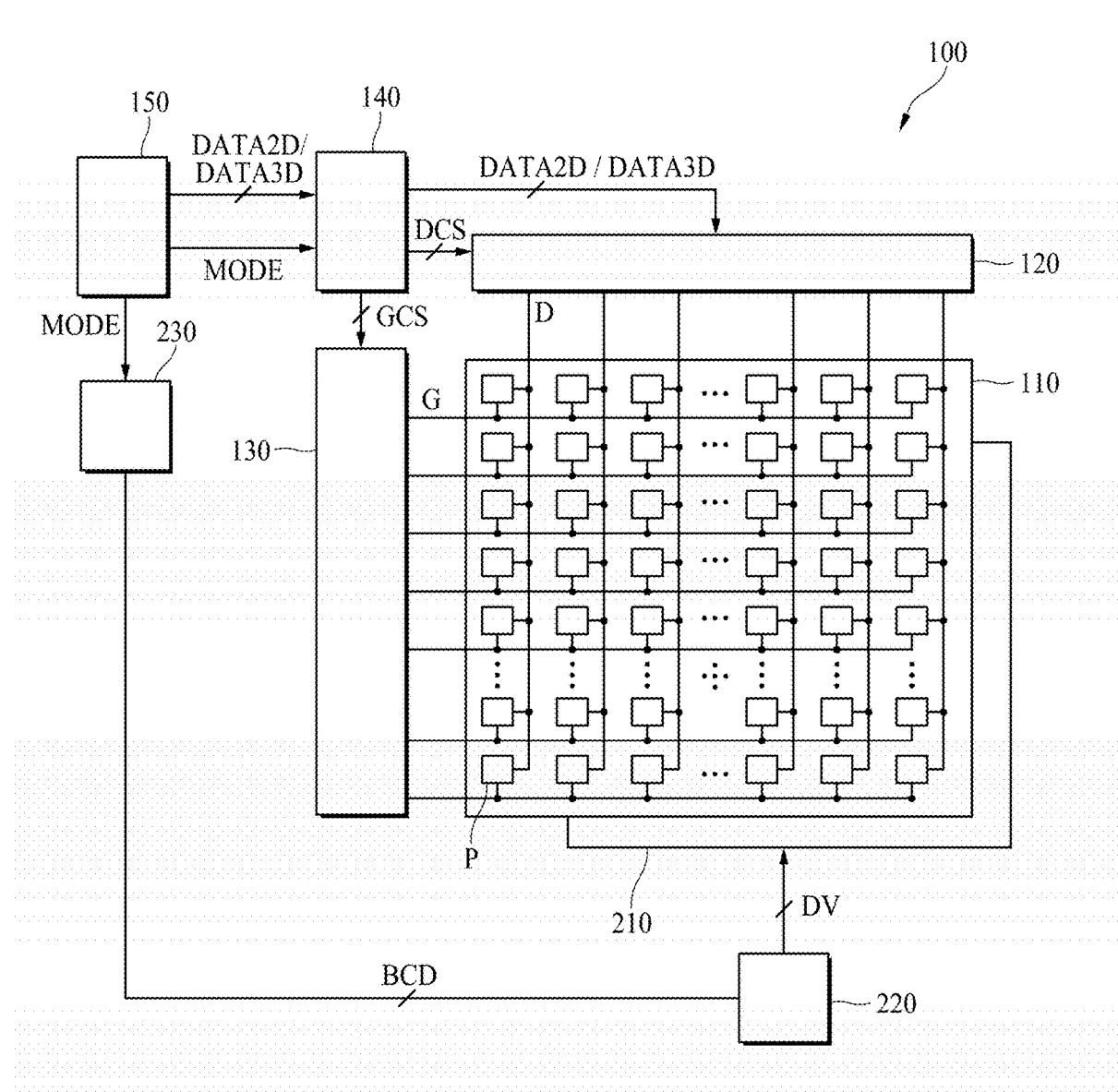
FIG. 1 is a block diagram illustrating an autostereoscopic 3D display device according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout the specification. In the following description, when the detailed description of the relevant known function or configuration is determined to unnecessarily obscure the important point of the present invention, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another element. For example, a first element could be termed a second element, and, similarly, a second element could be termed a first element, without departing from the scope of the present invention.

"X-axis direction", "Y-axis direction" and "Z-axis direction" should not be construed by a geometric relation only of a mutual vertical relation, and may have broader directionality within the range that elements of the present invention may act functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, the preferred embodiments of the present invention will be described in detail with reference to the accompanying drawings.

FIG. 1 is a block diagram illustrating an autostereoscopic 3D display device according to one embodiment of the present invention. Referring to FIG. 1, the autostereoscopic 3D display device 100 according to one embodiment of the present invention includes a display panel 110, a display panel driver, a display panel controller 140, a host system 150, a backlight unit 210, a backlight driver 220, and a backlight controller 230.

Since the autostereoscopic 3D display device 100 according to an embodiment of the present invention implements a barrier for displaying a 3D image by using a backlight unit 210, it is preferable that the autostereoscopic 3D display device 100 is implemented as a liquid crystal display device (LCD).

The display panel 110 displays an image by using pixels P. The display panel 110 includes a lower substrate, an upper substrate, and a liquid crystal layer interposed between the lower substrate and the upper substrate. Data lines D and gate lines G are formed on the lower substrate of the display panel 110. The data lines D may cross the gate lines G.

Figure 2:
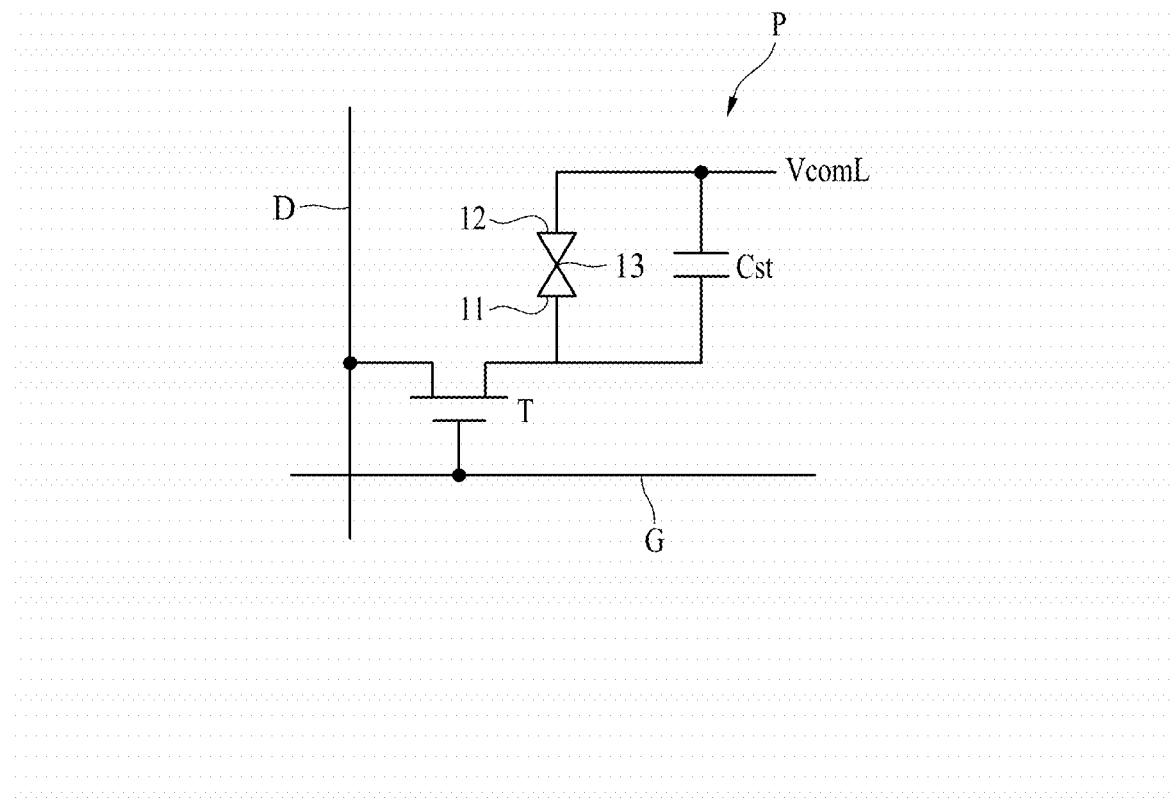
FIG. 2 is a circuit diagram illustrating a pixel of FIG. 1.

The pixels P may be formed at crossing portions between the data lines D and the gate lines G as shown in FIG. 2. Each of the pixels P may be connected to the data line D and the gate line G. Each of the pixels P may include a transistor T, a pixel electrode 11, a common electrode 12, a liquid crystal layer 13, and a storage capacitor Cst as shown in FIG. 2. The transistor T is turned on by a gate signal of the gate line G and supplies a data voltage of the data line D to the pixel electrode 11. The common electrode 12 is connected to a common line and supplied with a common voltage from the common line. For this reason, each of the pixels P may control transmittance of light from the backlight unit by driving liquid crystals of the liquid crystal layer 13 through an electric field generated by a potential difference between the data voltage supplied to the pixel electrode 11 and the common voltage supplied to the common electrode 12. As a result, the pixels P may display an image. Also, the storage capacitor Cst is provided between the pixel electrode 11 and the common electrode 12, and uniformly maintains the potential difference between the pixel electrode 11 and the common electrode 12.

The common electrode 12 is formed on the upper substrate in a vertical electric field driving mode such as a twisted nematic (TN) mode and a vertical alignment (VA) mode. Also, the common electrode 12 is formed on the lower substrate together with the pixel electrode in a horizontal electric field driving mode such as an in plane switching (IPS) mode and a fringe field switching (FFS) mode. Examples of a liquid crystal mode of the display panel 110 may include any mode as well as the TN mode, the VA mode, the IPS mode and the FFS mode.

A black matrix and color filters may be formed on the upper substrate of the display panel 110. The color filters may be formed at an opening which is not covered by the black matrix. If the display panel 110 is formed in a color filter on TFT (COT) structure, the color filters may be formed on the lower substrate of the display panel 110.

A polarizing pate may be attached to each of the lower substrate and the upper substrate of the display panel 110, and an alignment film for setting a pre-tilt angle of the liquid crystal may be formed. A column space for maintaining a cell gap of the liquid crystal layer may be formed between the lower substrate and the upper substrate of the display panel 110.

The display panel driver includes a data driver 120 and a gate driver 130.

The data driver 120 receives a data control signal DCS, 2D data DATA2D or 3D data DATA3D from the display panel controller 140. The data driver 120 may receive 2D data DATA2D in a 2D mode and receive 3D data DATA3D in a 3D mode. The data driver 120 converts the 2D data DATA2D or the 3D data DATA3D to positive polarity/negative polarity gamma compensation voltage in accordance with the data control signal DCS and generates analog data voltages. The analog data voltages output from source drive ICs are supplied to the data lines D of the display panel 110.

The gate driver 130 receives a gate control signal GCS from the display panel controller 140. The gate driver 130 generates gate signals in accordance with the gate control signal GCS and sequentially supplies the gate signals to the gate lines G of the display panel 110. Therefore, the data voltage of the data line D may be supplied to the pixel P to which the gate signals are supplied.

The display panel controller 140 receives the 2D data DATA2D from the host system 150 in the 2D mode, and receives the 3D data DATA3D from the host system 150 in the 3D mode. Also, the display panel controller 140 receives timing signals and a mode signal MODE from the host system 150. The timing signals may include a horizontal synchronization signal, a vertical synchronization signal, a data enable signal, and a dot clock. The display panel controller 140 may generate the gate control signal GCS and the data control signal DCS on the basis of the timing signals.

The display panel controller 140 supplies the gate control signal GCS to the gate driver 130, and supplies the data driver control signal DCS and the 2D data DATA2D or the 3D data DATA3D to the data driver 120. The display panel controller 140 may supply the 2D data DATA2D to the data driver 120 in the 2D mode and supply the 3D data DATA3D to the data driver 120 in the 3D mode.

The host system 150 supplies the 2D data DATA2D or the 3D data DATA3D to the display panel controller 140 through an interface such as a low voltage differential signaling (LVDS) interface and a transition minimized differential signaling (TMDS) interface. Also, the host system 150 supplies the mode signal MODE and the timing signals to the display panel controller 140, and supplies the mode signal MODE to the backlight controller 230. The mode signal MODE is a signal indicating which one of the 2D mode and the 3D mode corresponds to a current mode. For example, if the mode signal MODE has a first logic level voltage, the mode signal may be set to indicate the 2D mode, and if the mode signal MODE has a second logic level voltage, the mode signal may be set to indicate the 3D mode.

The autostereoscopic 3D display device generally needs a 3D light controller for displaying the 2D image displayed on the display panel 110 in the 2D mode as it is and displaying the 3D image displayed on the display panel 110 in the 3D mode in a viewing zone as a plurality of views. In general, the 3D light controller controls light from the pixels of the display panel by using the liquid crystal layer in the same manner as the switchable barrier and the switchable lens. However, the 3D light controller such as the switchable barrier and the switchable lens has a problem in that the manufacturing cost is high due to the liquid crystal layer. In an embodiment of the present invention, since the backlight unit 210 serves as the 3D light controller, a separate 3D light controller is not required, and the manufacturing cost may be reduced.

Figure 4A:
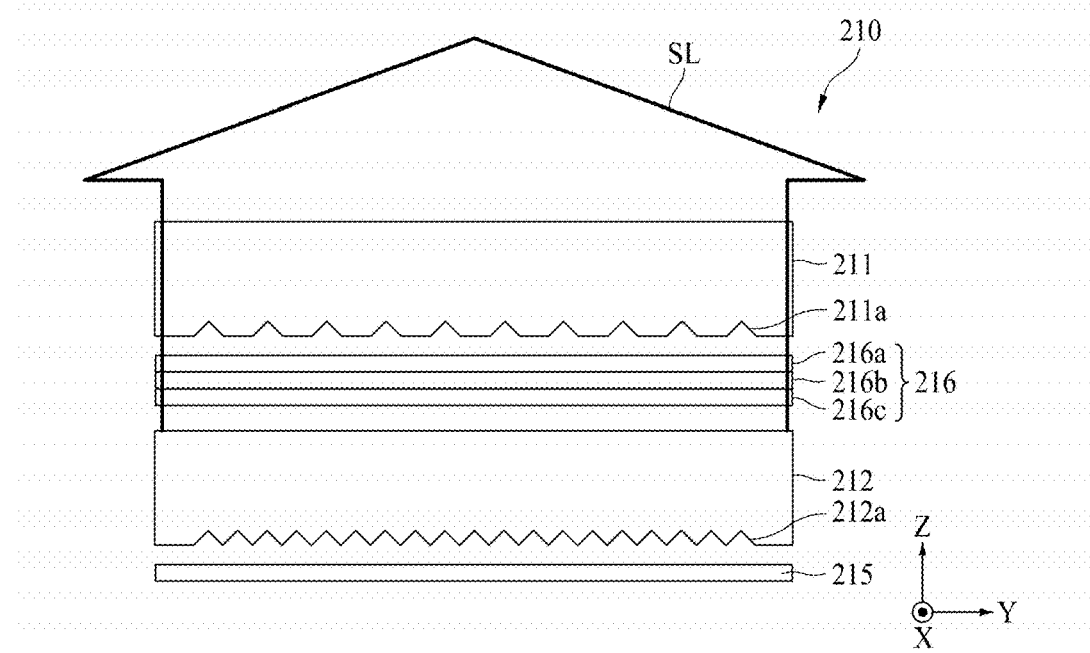
FIGS. 4A and 4B are cross-sectional views illustrating an example of the backlight unit of FIG. 3.
Figure 4B:
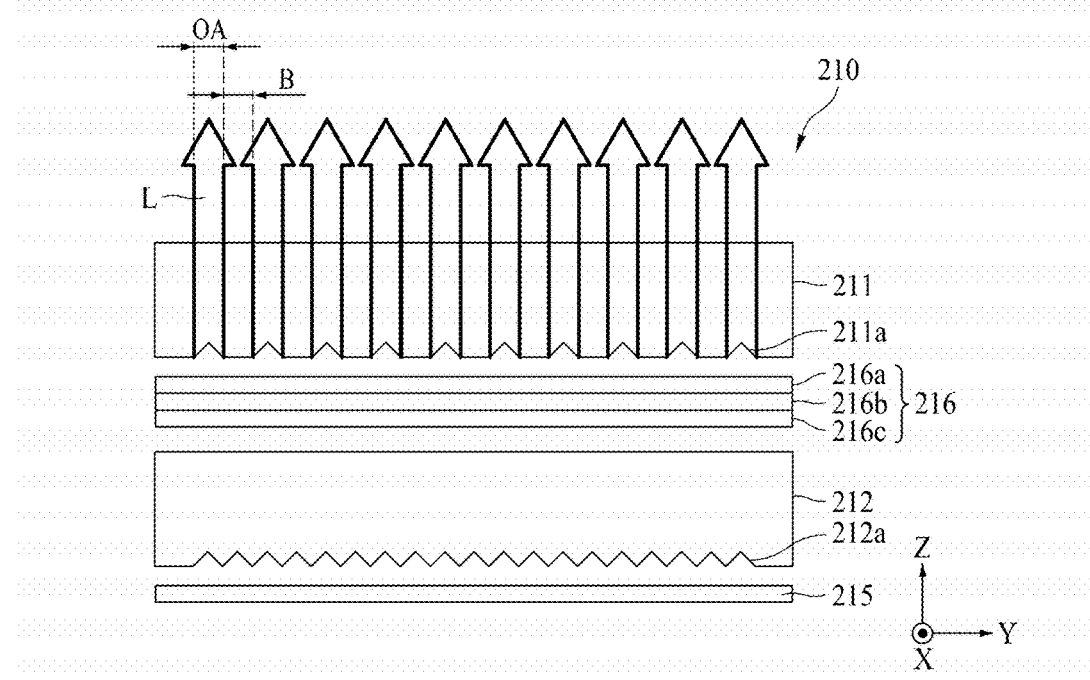

FIG. 3 is an exemplary view illustrating a backlight unit of FIG. 1. FIGS. 4A and 4B are cross-sectional views illustrating an example of the back-light unit of FIG. 3. The backlight unit 210, as shown in FIGS. 4A and 4B, may include a 3D light guide plate 211 including first light output patterns 211a, a 2D light guide plate 212 including second light output patterns 212a, first light sources 213 irradiating light to the 3D light guide plate 211, and second light sources 214 irradiating light to the 2D light guide plate 212. If the first light sources 213 emit light, since light is emitted from the areas where the first light output patterns 211a are formed and is not emitted from the other areas, the backlight unit 210 may provide light to the display panel 110 to allow the other areas to serve as barriers. Also, the backlight unit 210 may provide uniform surface light to the display panel 110 if the second light sources 214 emit light. A detailed description of the backlight unit 210 will be described later with reference to FIG. 3.

The backlight driver 220 receives backlight control data BCD from the backlight controller 230. The backlight driver 220 generates a first driving current DC1 for emitting light from the first light sources 213 of the backlight unit 210 and a second driving current DC2 for emitting light from the second light sources 214 in accordance with the backlight control data BCD. The backlight driver 220 supplies the first driving current DC1 to the first light sources 213, and supplies the second driving current DC2 to the second light sources 214.

The backlight controller 230 receives the mode signal MODE from the host system 150. The backlight controller 230 generates the backlight control data BCD in accordance with the mode signal MODE and supplies the backlight control data BCD to the backlight driver 220, thereby controlling the backlight driver 220. The backlight control data may be transmitted in a serial peripheral interface (SPI) data format.

In more detail, the backlight controller 230 controls the backlight driver 220 to emit light from the second light sources 214 in the 2D mode. Therefore, the backlight driver 220 supplies the second driving current DC2 to the second light sources 214 in the 2D mode. The backlight controller 230 controls the backlight driver 220 to emit light from the first light sources 213 in the 3D mode. Therefore, the backlight driver 220 supplies the first driving current DC1 to the first light sources 213 in the 3D mode. Also, the backlight controller 230 may control the first and second light sources 213 and 214 at a predetermined duty ratio in the 2D mode and the 3D mode by considering response properties of the liquid crystal.

The backlight controller 230 may be included in the display panel controller 140. That is, the display panel controller 140 and the backlight controller 230 may be formed as one IC.

A perspective view of the backlight unit 210 is shown in FIG. 3, and the output of light of the backlight unit in the 2D mode and the 3D mode is shown in FIGS. 4A and 4B. Also, for convenience of description, the first light sources 213 and the second light sources 214 are omitted in FIGS. 4A and 4B.

Referring to FIG. 3, the backlight unit 210 according to one embodiment of the present invention includes a 3D light guide plate 211, a 2D light guide plate 212, first light sources 213, second light sources 214, a reflective sheet 215, optical sheets 216, and first and second light source circuit boards 217 and 218.

The 3D light guide plate 211 is arranged on the uppermost of the backlight unit 210, and includes the first light output patterns 211a. If the first light output patterns 211a are arranged on a lower surface of the 3D light guide plate 211 as shown in FIGS. 4A and 4B, the first light output patterns 211a may be formed to be engraved to allow light entering the 3D light guide plate 211 from the first light sources 213 to be output to the upper portion of the 3D light guide plate 211 by the first light output patterns 211a. Also, the first light output patterns 211a are formed to be spaced apart from each other in x-axis direction to output light L from only areas where the first light output patterns 211a are arranged. A detailed description of the first light output patterns 211a will be described later with reference to FIGS. 6, 7, 9, 10 and 13 to 16.

The 2D light guide plate 212 is arranged below the 3D light guide plate 211. Light entering the 2D light guide plate 212 from the second light sources 214 may be output to the upper portion of the 2D light guide plate 212 as surface light. The 2D light guide plate 212 may include second light output patterns 212a to output surface light. The second output patterns 212a may be formed at a lower portion of the 2D light guide plate 212 as shown in FIGS. 4A and 4B.

The second light output patterns 212a may be formed in, but not limited to, a mountain type prism as shown in FIGS. 4A and 4B. Also, to output uniform surface light, the second light output patterns 212a may be formed more densely as they become far away from the first light sources 213.

The first light sources 213 are arranged at one side of the 3D light guide plate 211 and irradiates light to the 3D light guide plate 211. The second light sources 214 are arranged at one side of the 2D light guide plate 212 and irradiates light to the 2D light guide plate 212. Although the first light sources 213 are arranged at one side of the 3D light guide plate 211 and the second light sources 214 are arranged at one side of the 2D light guide plate 212 in FIG. 3, the first light sources 213 and the second light sources 214 are not limited to the example of FIG. 3. That is, the first light sources 213 may be arranged at both sides of the 3D light guide plate 211, and the second light sources 214 may be arranged at both sides of the 2D light guide plate 212. The first and second light sources 213 and 214 may include any one or two types of light sources of a hot cathode fluorescent lamp (HCFL), a cold cathode fluorescent lamp (CCFL), an external electrode fluorescent lamp (EEFL), a light emitting diode (LED), and an organic light emitting diode (OLED).

Each of the first light sources 213 is packaged on the first light source circuit board 217, and may emit light by receiving a first driving current DC1 from the first light source circuit board 217. Each of the second light sources 214 is packaged on the second light source circuit board 218, and may emit light by receiving a second driving current DC2 from the second light source circuit board 218.

The reflective sheet 215 may be arranged below the 2D light guide plate 212. The reflective sheet 215 may reduce light loss by reflecting light, which is headed to the lower portion from the 2D light guide plate 212, toward the 2D light guide plate 212.

The optical sheets 216 may be arranged between the 3D light guide plate 211 and the 2D light guide plate 212 to irradiate the light from the 2D light guide plate 212 to the display panel 10 as more uniform surface light. The optical sheets 216 may include at least one diffusion sheet and prism sheet. For example, the optical sheets 216 may include a diffusion sheet 216a, a prism sheet 216b, and a dual brightness enhancement film 216c as shown in FIG. 3.

Hereinafter, the output of light of the backlight unit 210 in the 2D mode and the 3D mode will be described in detail with reference to FIGS. 4A and 4B.

In the 2D mode, the second light sources 214 emit light and the emitted light enters the 2D light guide plate 212. As shown in FIG. 4A, in the 2D mode, the light from the second light sources 214 is output to the upper portion of the 2D light guide plate 212 by the second light output patterns 212a of the 2D light guide plate 212 as surface light SL. The light output to the upper portion of the 2D light guide plate 212 may be output as more uniform surface light SL through the optical sheets 216, and may enter the display panel 10 by passing through the 3D light guide plate 211 as it is.

In the 3D mode, the first light sources 213 emit light and the emitted light enters the 3D light guide plate 211. The light from the first light sources 213 is output to the upper portion of the 3D light guide plate 211 by the first light output patterns 211a of the 3D light guide plate 211. Particularly, as shown in FIG. 4B, the light L may be output from only the areas where the first light output patterns 211a are arranged, by means of the first light output patterns 211a.

That is, the 3D light guide plate 211 outputs light L from areas only where the first light output patterns 211a are arranged, and hardly outputs light from areas between the first light output patterns 211a. Therefore, as shown in FIG. 5, the areas where the first light output patterns 211a are arranged serve as opening areas OA when a 3D image is displayed, and the areas between the first light output patterns 211a serve as barriers B.

As described above, in the embodiment of the present invention, if the second light sources 214 emit light to irradiate the light to the 2D light guide plate 212 in the 2D mode, uniform surface light may be provided to the display panel 10. Also, in the embodiment of the present invention, if the first light sources 213 emit light to irradiate the light to the 3D light guide plate 211 in the 3D mode, the areas where the first light output patterns 211a are arranged may serve as opening areas OA, and the areas between the first light output patterns 211a may serve as barriers B. That is, in the embodiment of the present invention, in the 3D mode, the backlight unit 210 may serve as the 3D light controller. As a result, in the embodiment of the present invention, a 3D image may be displayed without using the 3D light controller that includes a liquid crystal layer. Therefore, in the embodiment of the present invention, since the 3D image may be displayed by only adding the 3D light guide plate 211 and the first light sources 213, the manufacturing cost may be reduced as compared with the case where the 3D light controller, which includes a liquid crystal layer, is used.

Figure 5:
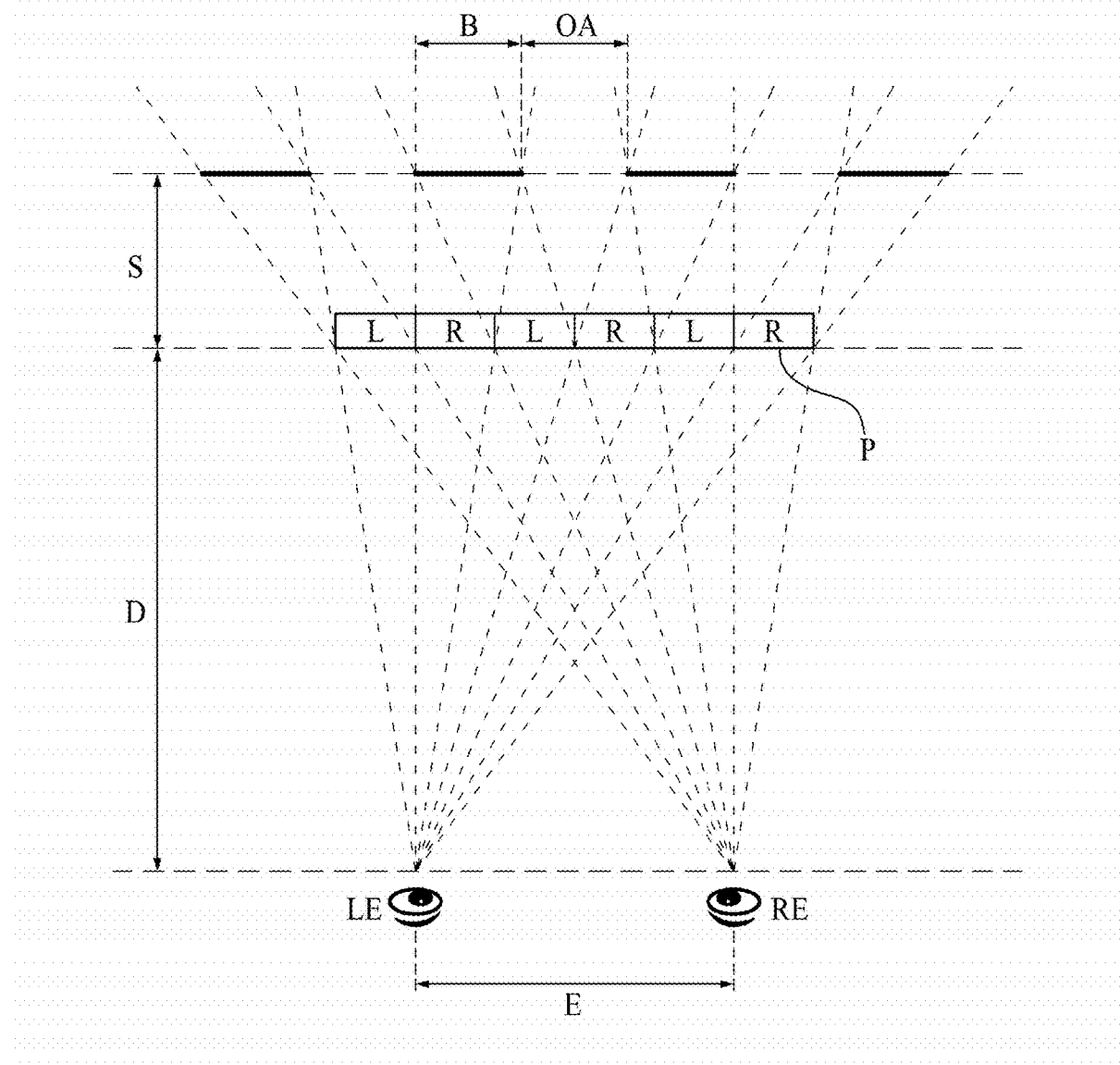
FIG. 5 is an exemplary view illustrating a method for implementing a 3D image in a 3D mode according to an embodiment of the present invention.

FIG. 5 is an exemplary view illustrating a method for implementing a 3D image in a 3D mode.

In FIG. 5, 'S' is a rear distance, and denotes a distance from the liquid crystal layer of the display panel 110 to the first light output patterns 211a of the 3D light guide plate 211, OD denotes an optimal viewing distance of a 3D image, and 'E' is a distance between both eyes, and may be 65 mm. The optimal viewing distance OD of the 3D image may be designed by a width of the pixel P, the rear distance S, and the distance E between both eyes.

As shown in FIG. 4B, if the first light sources 213 emit light, the light is emitted from the areas where the first light output patterns 211a are arranged. Therefore, if the first light sources 213 emit light to irradiate the light to the 3D light guide plate 211 in the 3D mode, the areas where the first light output patterns 211a are arranged may serve as opening areas OA, and the areas between the first light output patterns 211a may serve as barriers B.

Since the first light output patterns 211a are arranged to be spaced from each other, the opening areas OA and the barriers B are arranged alternately as shown in FIG. 5. Due to arrangement of the opening areas OA and the barriers B, only a left-eye image of the pixels P may be input to a left eye LE of a user and only a right-eye image of the pixels P may be input to a right eye RE of a user, as shown in FIG. 5. Therefore, the user may view a 3D image.

Meanwhile, the width of the opening area OA may be calculated as expressed by the following Equation 1, and the width of the barrier B may be calculated as expressed by the following Equation 2.

$$Q = \frac{1 + \frac{B}{P} - \frac{2R}{E}}{\frac{1}{P} - \frac{1}{E}} \quad \text{[Equation 1]}$$

$$M = \frac{1 - \frac{B}{P} + \frac{2R}{E}}{\frac{1}{P} - \frac{1}{E}} \quad \text{[Equation 2]}$$

In Equation 1 and Equation 2, Q denotes the width of the opening area OA, M denotes the width of the barrier B, P denotes the pitch of the pixel P, B denotes a width of a black matrix, and 2R denotes a viewing margin. In Equation 1 and Equation 2, if $$\frac{B}{P} \text{ and } \frac{2R}{E}$$

are substantially the same as each other, the width Q of the opening area OA and the width M of the barrier B may substantially be the same as each other.

Embodiments of the first light sources and the 3D light guide plate if the light output patterns 211a are formed on the lower surface of the 3D light guide plate 211 will be described in detail with reference to FIGS. 6 and 7.

Figure 6:
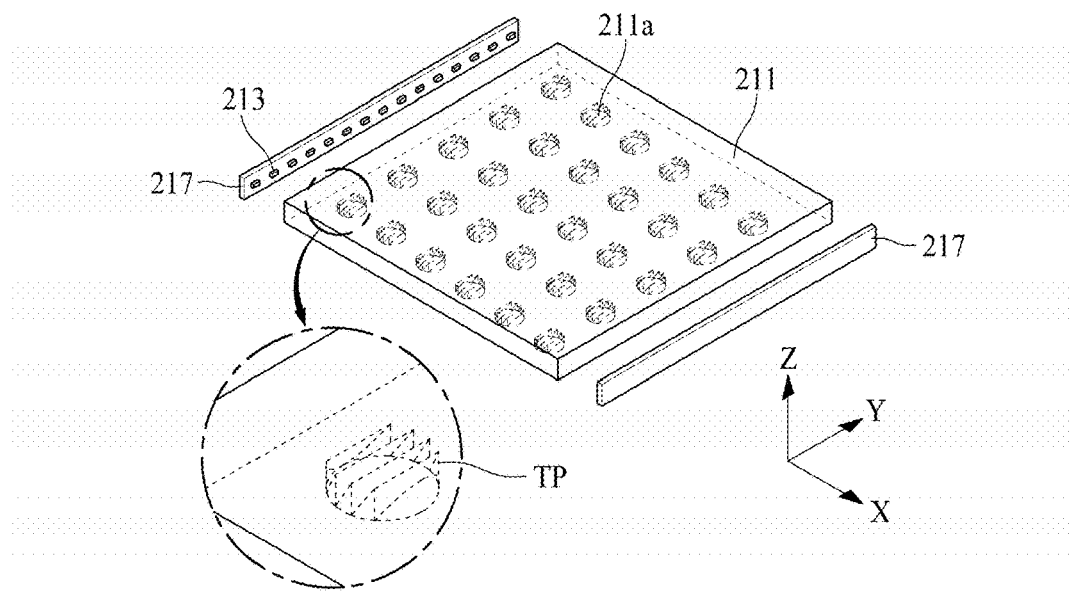
FIG. 6 is a perspective view illustrating an example of first light sources and a 3D light guide plate of FIG. 3.

FIG. 6 is a perspective view illustrating an example of first light sources and a 3D light guide plate of FIG. 3. For convenience of description, only the 3D light guide plate 211, the first light sources 213, and the first light source circuit board 217 are shown in FIG. 6.

Referring to FIG. 6, the first light sources 213 are packaged on the first light source circuit board 217. The first light sources 213 are arranged at opposing sides of the 3D light guide plate 211, wherein the opposing sides of the 3D light guide plate 211 face each other.

The 3D light guide plate 211 includes the first light output patterns 211a. The first light output patterns 211a may be formed to be engraved on the lower surface of the 3D light guide plate 211 as shown in FIG. 6, and may be dot prism patterns. Each of the dot prism patterns has a dot type, and may include a plurality of triangular prisms (TP), each of which may have a triangular shaped base.

To output the light from the first light sources 213 to the upper portion of the 3D light guide plate 211 by the dot prism patterns, when a direction along which the first light sources 213 are arranged is a first direction (Y-axis direction), the dot prism patterns may be arranged in parallel with the second direction crossing the first direction (Y-axis direction). Also, it is preferable that the triangular prism TP of each of the dot prism patterns is formed longitudinally in the first direction (Y-axis direction). That is, a direction of sides between the bases of the triangular prism TP may be formed in the first direction (Y-axis direction).

Figure 7:
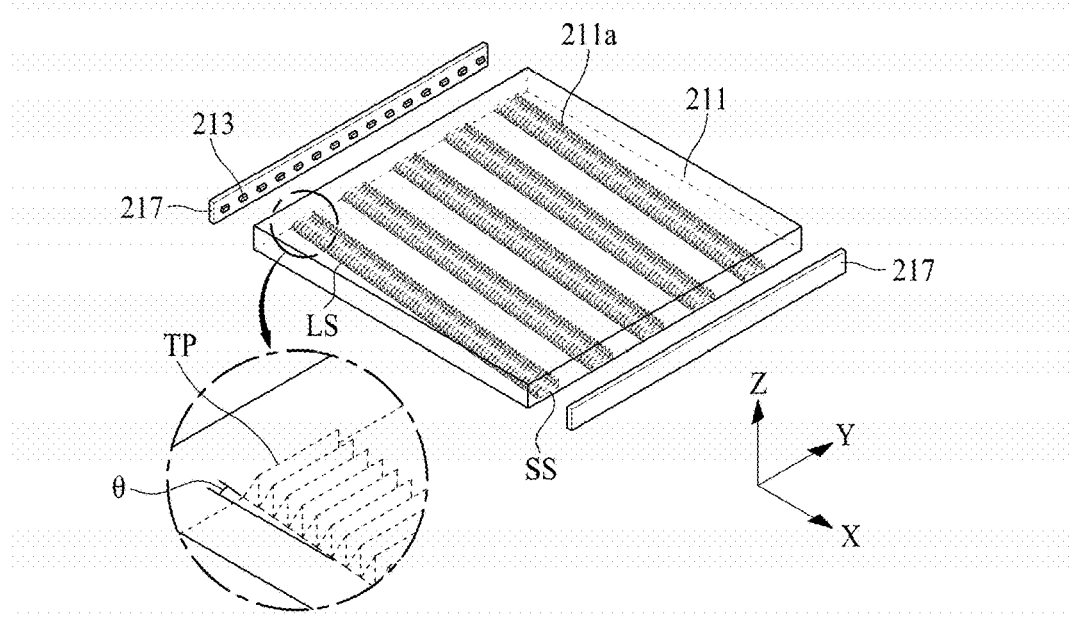
FIG. 7 is a perspective view illustrating another example of first light sources and a 3D light guide plate of FIG. 3.

FIG. 7 is a perspective view illustrating another example of first light sources and a 3D light guide plate of FIG. 3. For convenience of description, only the 3D light guide plate 211, the first light sources 213, and the first light source circuit board 217 are shown in FIG. 7.

Referring to FIG. 7, the first light sources 213 are packaged on the first light source circuit board 217. The first light sources 213 are arranged at opposing sides of the 3D light guide plate 211, wherein the opposing sides of the 3D light guide plate 211 face each other.

The 3D light guide plate 211 includes the first light output patterns 211a. The first light output patterns 211a may be formed to be engraved on the lower surface of the 3D light guide plate 211 as shown in FIG. 7, and may be line prism patterns. Each of the line prism patterns includes a plurality of triangular prisms (TP), each of which may have a triangular shaped base.

To output the light from the first light sources 213 to the upper portion of the 3D light guide plate 211 by the line prism patterns, when an alignment direction along which the first light sources 213 are arranged is a first direction (Y-axis direction), the line prism patterns may be arranged in parallel with the second direction crossing the first direction (Y-axis direction). That is, a direction of a short side SS of each of the line prism patterns may be parallel with the first direction (Y-axis direction), and a long side LS may be parallel with the second direction. The direction of the short side SS of each of the line prism patterns may be a direction of sides between bases of the triangular prism TP. In this case, the triangular prism TP of each of the line prism patterns is formed longitudinally in the first direction (Y-axis direction).

Particularly, to minimize 3D crosstalk, the long side of each of the line prism patterns may be inclined at a predetermined angle θ with respect to one side of the 3D light guide plate 211. The 3D crosstalk means that a user sees an overlap between a left-eye image and a right-eye image, and a viewer may visualize a deterioration of picture quality of the 3D image due to the 3D crosstalk.

Figure 8A:
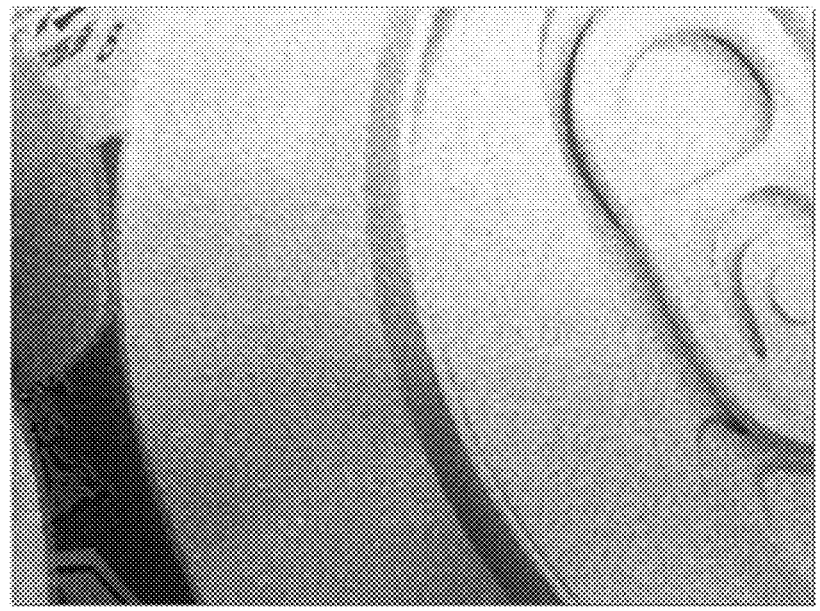
FIGS. 8A and 8B are exemplary views illustrating a 3D image displayed by a 3D light guide plate including a dot pattern (FIG. 8A) and a 3D image displayed by a 3D light guide plate including a line prism pattern (FIG. 8B)
Figure 8B:
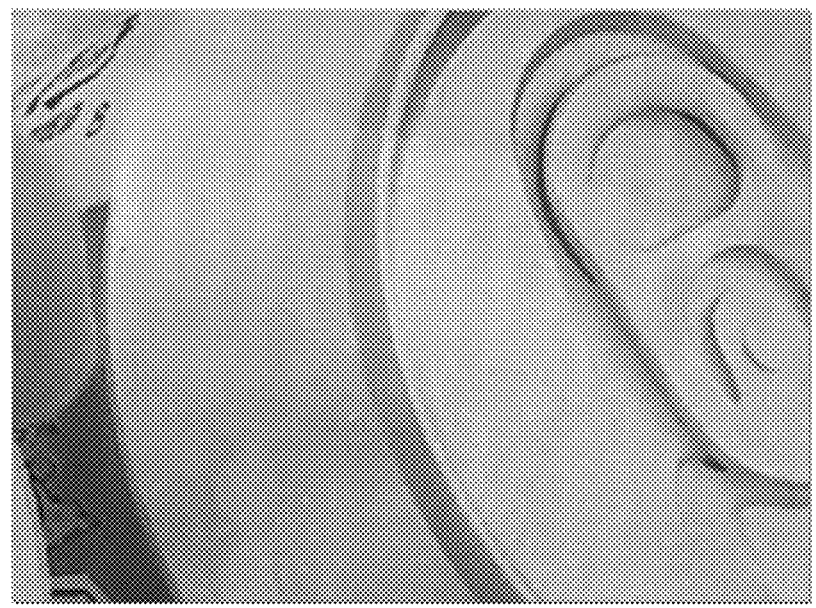

FIGS. 8A and 8B are exemplary views illustrating a 3D image displayed by a 3D light guide plate including a dot pattern and a 3D image displayed by a 3D light guide plate including a line prism pattern.

Figure 9A:
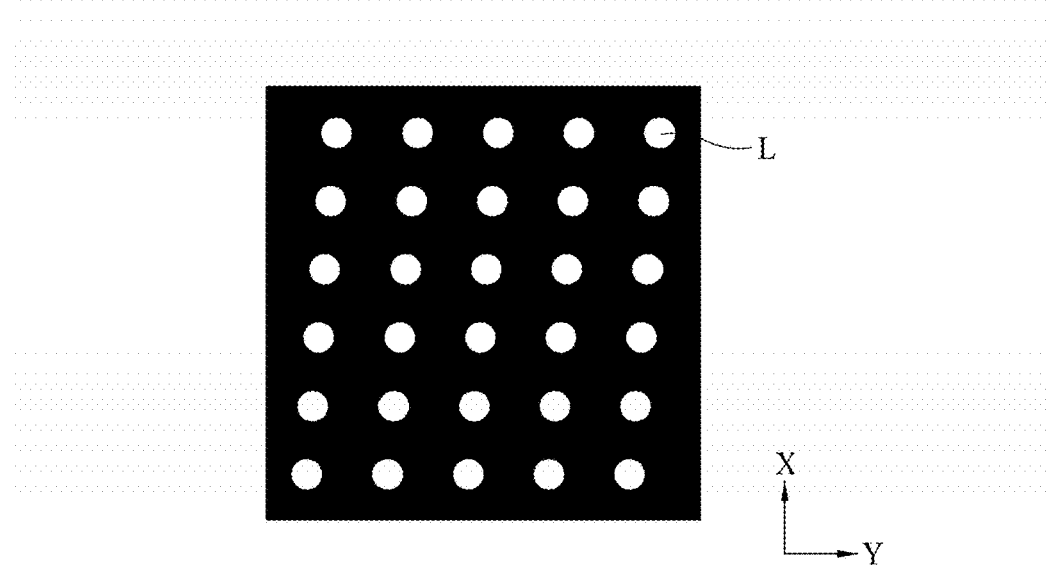
FIGS. 9A and 9B are exemplary views illustrating light output of a backlight unit when a 3D light guide plate including a dot pattern is used (FIG. 9A) and light output of a backlight unit when a 3D light guide plate including a line prism pattern is used (FIG. 9B)

As shown in FIG. 6, if the first light output patterns 211a are formed by dot prism patterns, the backlight unit 210 outputs light L in a dot type as shown in FIG. 9A. In this case, since the light L is not output between the dot prism patterns arranged in X-axis direction, the light supplied between the pixels of the display panel 110, which are arranged in X-axis direction, may be varied. For this reason, luminance between the pixels of the display panel 110 becomes non-uniform. As shown in FIG. 8A, color noise may be visible to a viewer. That is, a problem occurs in that quality of a 3D image is lowered.

Figure 9B:
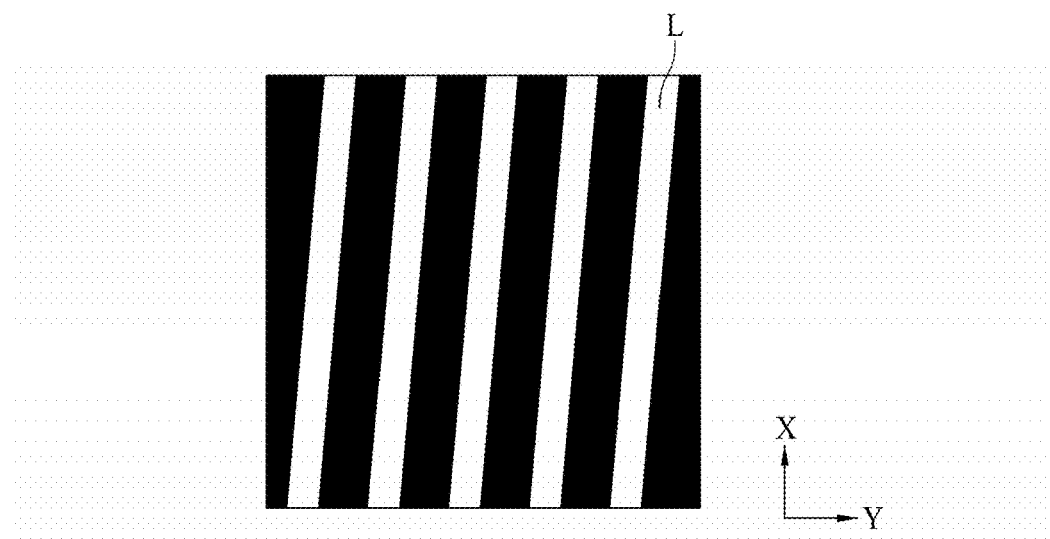

However, if the first light output patterns 211*a* are formed in line prism patterns as shown in FIG. 7, the backlight unit 210 outputs light L in a line type as shown in FIG. 9B. In this case, when the backlight unit 210 outputs the light L in a dot type as shown in FIG. 9A, a problem that the light L is not output between the dot prism patterns arranged in the X-axis direction is not caused. Therefore, since the light L may uniformly be supplied to the pixels of the display panel 110 between the pixels of the display panel 110, which are arranged in the X-axis direction, color noise may be prevented from being visible to a viewer due to luminance non-uniformity between the pixels as shown in FIG. 8B.

Hereinafter, embodiments of the first light sources and the 3D light guide plate if the first light output patterns 211*a* are formed on the lower surface of the 3D light guide plate 211 will be described in detail with reference to FIGS. 10 and 11.

Figure 10:
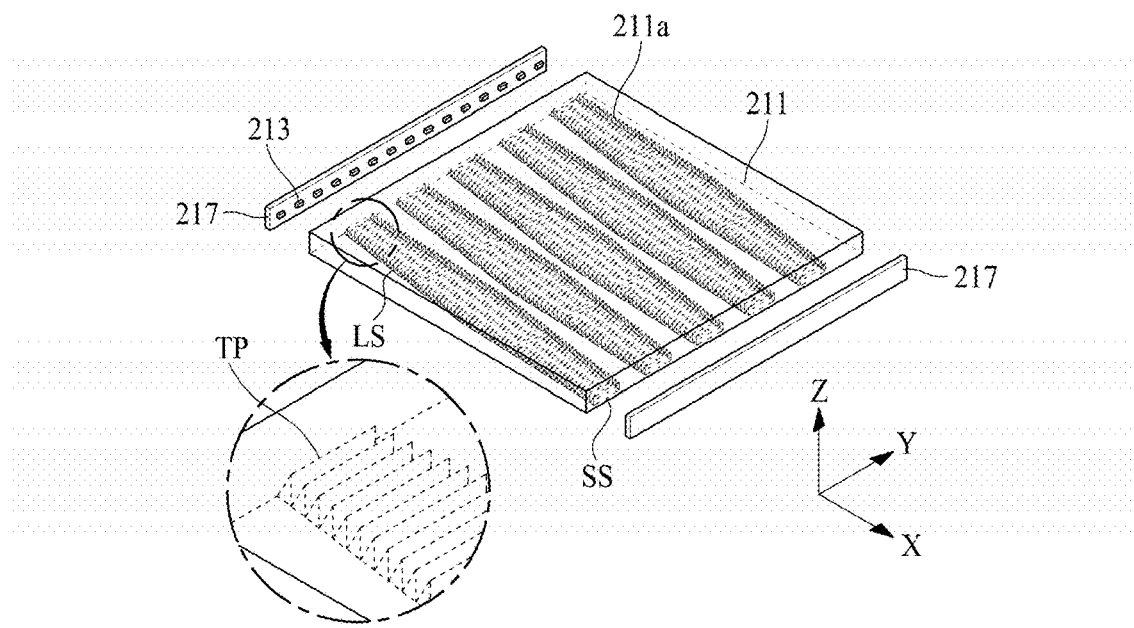
FIG. 10 is a perspective view illustrating still another example of first light sources and a 3D light guide plate of FIG. 3.

FIG. 10 is a perspective view illustrating another example of first light sources and a 3D light guide plate of FIG. 3. For convenience of description, only the 3D light guide plate 211, the first light sources 213, and the first light source circuit board 217 are shown in FIG. 10.

In FIG. 10, the first light output patterns 211*a* of the 3D light guide plate 211 are line prism patterns, and are substantially the same as those described with reference to FIG. 7 except that a width of each of the line prism patterns is varied depending on the distance from the first light sources 213. Therefore, detailed description of the 3D light guide plate 211, the first light sources 213 and the first light source circuit board 217, which are shown in FIG. 10, will be omitted.

Referring to FIG. 10, the width of each of the line prism patterns may be widened toward the center of the 3D light guide plate 211 from both sides of the 3D light guide plate 211. The width of each of the line prism patterns is a short side (SS) length of each of the line prism patterns. If the first light sources 213 are arranged at both sides of the 3D light guide plate 211, the light output to the upper portion of the 3D light guide plate 211 may be reduced by the line prism patterns as the light becomes far away from the first light sources 213. If the width of each of the line prism patterns is designed to be widened as the light becomes far away from the first light sources 213, the light output to the upper portion of the 3D light guide plate 211 may be prevented from being reduced as the light becomes far away from the first light sources 213.

As described above, in the embodiment of the present invention, if the first light sources 213 are arranged at both sides of the 3D light guide plate 211, the width of each of the line prism patterns is formed to be widened toward the center of the 3D light guide plate 211 from both sides of the 3D light guide plate 211. As a result, in the embodiment of the present invention, uniform light may be output in the 3D mode regardless of the distance between the line prism patterns and the first light sources 213.

Figure 11:
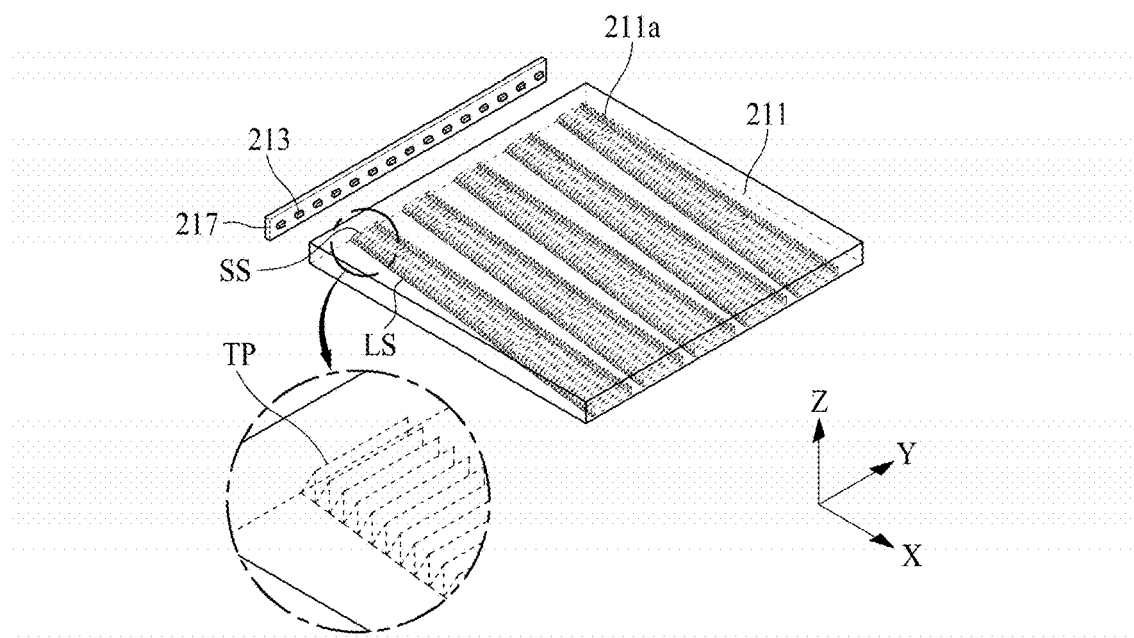
FIG. 11 is a perspective view illustrating further still another example of first light sources and a 3D light guide plate of FIG. 3.

FIG. 11 is a perspective view illustrating further still another example of first light sources and a 3D light guide plate of FIG. 3. For convenience of description, only the 3D light guide plate 211, the first light sources 213, and the first light source circuit board 217 are shown in FIG. 11.

In FIG. 11, the first light output patterns 211*a* of the 3D light guide plate 211 are line prism patterns, and are substantially the same as those described with reference to FIG. 7 except that a width of each of the line prism patterns is varied depending on the distance from the first light sources 213 and the first light sources 213 are arranged only at one side of the 3D light guide plate 211. Therefore, detailed description of the 3D light guide plate 211, the first light sources 213 and the first light source circuit board 217, which are shown in FIG. 11, will be omitted.

Referring to FIG. 11, the first light sources 213 are arranged only at one side of the 3D light guide plate 211. The width of each of the line prism patterns may be widened toward the other side of the 3D light guide plate 211 from one side of the 3D light guide plate 211. The width of each of the line prism patterns is a short side (SS) length of each of the line prism patterns. One side of the 3D light guide plate 211 faces the other side of the 3D light guide plate 211. If the first light sources 213 are arranged only at one side of the 3D light guide plate 211, the light output to the upper portion of the 3D light guide plate 211 may be reduced by the line prism patterns as the light becomes far away from the first light sources 213. If the width of each of the line prism patterns is designed to be widened as the light becomes far away from the first light sources 213, the light output to the upper portion of the 3D light guide plate 211 may be prevented from being reduced as the light becomes far away from the first light sources 213.

As described above, in the embodiment of the present invention, if the first light sources 213 are arranged only at one side of the 3D light guide plate 211, the width of each of the line prism patterns is formed to be widened toward the other side of the 3D light guide plate 211 that faces the one side of the 3D light guide plate 211. As a result, in the embodiment of the present invention, uniform light may be output in the 3D mode regardless of the distance between the line prism patterns and the first light sources 213.

Meanwhile, the first light output patterns 211*a* may be formed on and upper side of the 3D light guide plate 211. Hereinafter, embodiments that the first light output patterns 211*a* are formed on an upper side of the 3D light guide plate 211 will be described in detail with reference to FIGS. 12 and 13.

Figure 12:
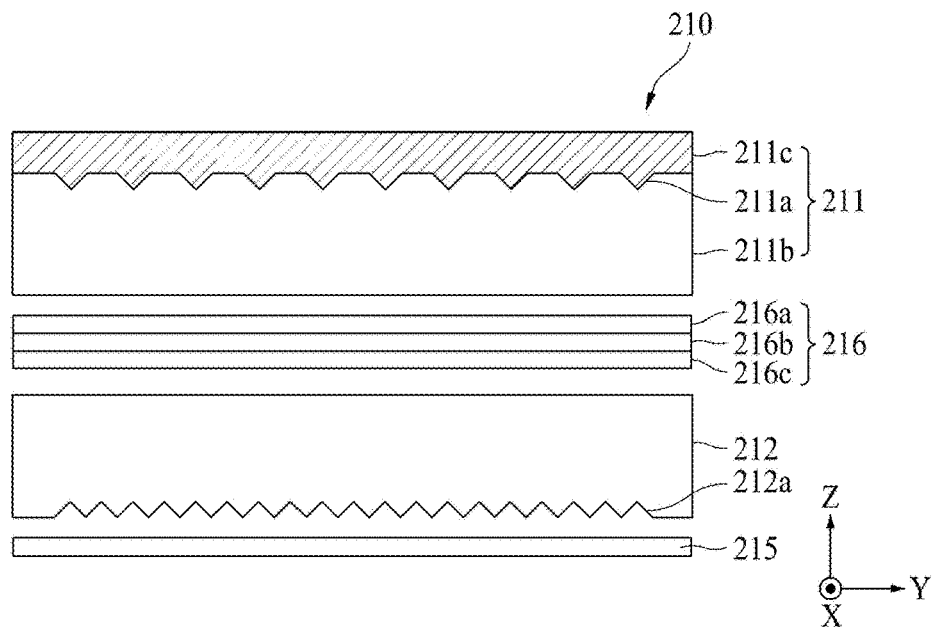
FIG. 12 is a cross-sectional view illustrating another example of the backlight unit of FIG. 3.

FIG. 12 is a cross-sectional view illustrating another example of a backlight unit of FIG. 3.

For convenience of description, only a 3D light guide plate 211, a 2D light guide plate 212, a reflective sheet 215, optical sheets 216, and first and second light source circuit boards 217 and 218 of the backlight unit 210 are shown in FIG. 12. Since the 2D light guide plate 212, the reflective sheet 215, the optical sheets 216, and the first and second light source circuit boards 217 and 218, which are shown in FIG. 12, are substantially the same as those described with reference to FIGS. 3, 4A and 4B, their detailed description will be omitted.

Referring to FIG. 12, the 3D light guide plate 211 includes a light guide plate 211*b* on an upper surface of which the first light output patterns 211*a* are formed as an engraved pattern, and a light emitting layer 211*c* arranged on the light guide plate 211*b*. At this time, if the first light sources 213 irradiate light to the light guide plate 211*b*, a refractive index of the light emitting layer 211*c* should be greater than that of the light guide plate 211*b* by Snell's law to output the light to the upper portion of the 3D light guide plate 211 through the first light output patterns 211*a*.

As shown in FIG. 12, if the first light output patterns 211*a* are formed on an upper surface of the light guide plate 211*b*, a rear distance 'S' from the liquid crystal layer of the display panel 110 to the first light output patterns 211a of the 3D light guide plate 211 may be reduced as much as the thickness of the light guide plate 211b as compared with the case that the first light output patterns 211a are formed below the light guide plate 211b as shown in FIGS. 4A and 4B. An increased distance 'S' and a widened opening area OA of FIG. 5 may cause 3D crosstalk to be increased.

As described above, in the embodiment of the present invention, the 3D light guide plate 211 includes the light guide plate 211b an upper surface of which the first light output patterns 211a are fixated as an engraved pattern, and the light emitting layer 211c is arranged on the light guide plate 211b. Particularly, in the embodiment of the present invention, since the refractive index of the light emitting layer 211c is greater than that of the light guide plate 211b, the light may be output to the upper portion of the 3D light guide plate 211 through the first light output patterns 211a. As a result, in the embodiment of the present invention, 3D crosstalk may be reduced more than the case that the first light output patterns 211a are formed on a lower surface of the 3D light guide plate 211.

Meanwhile, the first light output patterns 211a may be formed in the dot prism patterns of FIG. 6 or the line prism patterns of FIG. 7 except that the first light output patterns 211a are formed on an upper surface of the light guide plate 211b. Also, the first light output patterns 211a may be formed such that a width of each of the first light output patterns 211a may be widened toward the center of the 3D light guide plate 211 from both sides of the 3D light guide plate 211 as shown in FIG. 10 except that the first light output patterns 211a are formed on the light guide plate 211b. Also, the first light output patterns 211a may be formed such that a width of each of the first light output patterns 211a may be widened toward the other side of the 3D light guide plate 211 from one side of the 3D light guide plate 211 as shown in FIG. 11 except that the first light output patterns 211a are formed on the light guide plate 211b.

Figure 13:
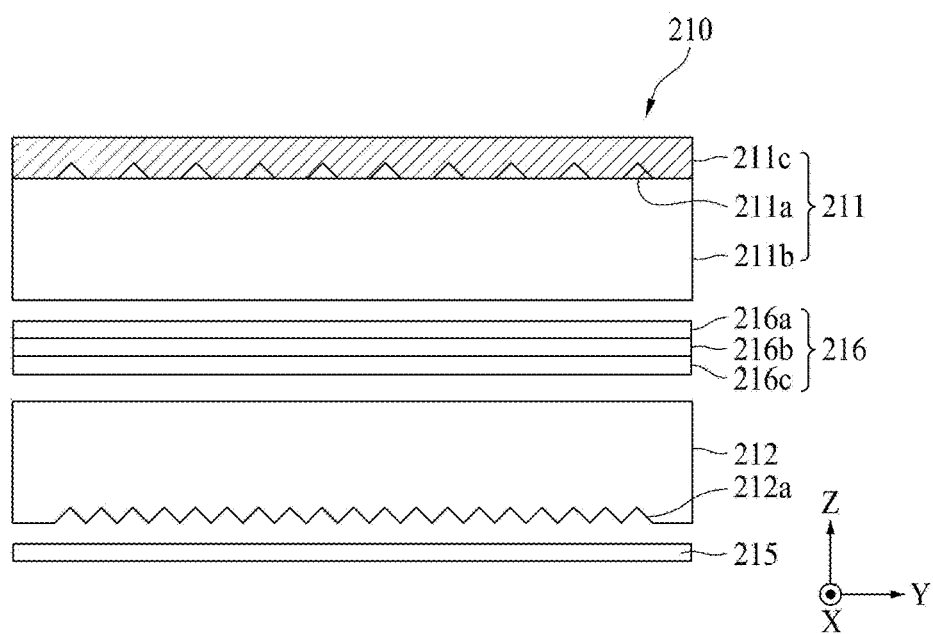
FIG. 13 is a cross-sectional view illustrating another example of the backlight unit of FIG. 3.

FIG. 13 is a cross-sectional view illustrating another example of a backlight unit of FIG. 3.

For convenience of description, only a 3D light guide plate 211, a 2D light guide plate 212, a reflective sheet 215, optical sheets 216, and first and second light source circuit boards 217 and 218 of the backlight unit 210 are shown in FIG. 13. Since the 2D light guide plate 212, the reflective sheet 215, the optical sheets 216, and the first and second light source circuit boards 217 and 218, which are shown in FIG. 13, are substantially the same as those described with reference to FIGS. 3, 4A and 4B, their detailed description will be omitted.

Referring to FIG. 13, the 3D light guide plate 211 includes a light guide plate 211b, and a light emitting layer 211c arranged on the light guide plate 211b. The first light output patterns 211a are formed as an engraved pattern on a surface of the light emitting layer 211c. At this time, if the first light sources 213 irradiate light to the light guide plate 211b, a refractive index of the light guide plate 211b should be greater than that of the light emitting layer 211c to output the light to the upper portion of the 3D light guide plate 211 through the first light output patterns 211a. Preferably air is filled between the light guide plate 211b and the first light output patterns 211a of the light emitting layer 211c. For example, if the refractive index of the light guide plate 211b is 1.5, the refractive index of the light emitting layer 211c is 1.4, and the air having a refractive index of 1.0 is filled between the first light output patterns 211a of the light emitting layer 211c and the light guide plate 211b, the light may be output to the upper portion of the 3D light guide plate 211 by the first light output patterns 211a.

As shown in FIG. 13, if the first light output patterns 211a are formed on and upper side of the light emitting layer 211c, a rear distance 'S' from the liquid crystal layer of the display panel 110 to the first light output patterns 211a of the 3D light guide plate 211 may be reduced as much as the thickness of the light guide plate 211b as compared with the case that the first light output patterns 211a are formed below the light guide plate 211b as shown in FIGS. 4A and 4B. An increased distance 'S' and a widened opening area OA of FIG. 5 may cause 3D crosstalk to be increased.

As described above, in the embodiment of the present invention, the 3D light guide plate 211 includes the light guide plate 211b, and the light emitting layer 211c arranged on the light guide plate 211b, and the first light output patterns 211a are formed as an engraved pattern at an upper side of the light guide plate 211b. Particularly, in the embodiment of the present invention, the refractive index of the light guide plate 211b is greater than that of the light emitting layer 211c, and air is filled between the light guide plate 211b and the first light output patterns 211a of the light emitting layer 211c, whereby the light may be output to the upper portion of the 3D light guide plate 211 by the first light output patterns 211a. As a result, in the embodiment of the present invention, 3D crosstalk may be reduced more than the case that the first light output patterns 211a are formed on a lower side of the 3D light guide plate 211.

Meanwhile, the first light output patterns 211a may be formed in the dot prism patterns of FIG. 6 or the line prism patterns of FIG. 7 except that the first light output patterns 211a are formed at an upper side of the light guide plate 211b. Also, the first light output patterns 211a may be formed such that a width of each of the first light output patterns 211a may be widened toward the center of the 3D light guide plate 211 from opposing sides of the 3D light guide plate 211 as shown in FIG. 10 except that the first light output patterns 211a are formed at an upper side of the light guide plate 211b. Also, the first light output patterns 211a may be formed such that a width of each of the first light output patterns 211a may be widened toward the opposing side of the 3D light guide plate 211 from one side of the 3D light guide plate 211 as shown in FIG. 11 except that the first light output patterns 211a are formed at an upper side of the light guide plate 211b.

Figure 14:
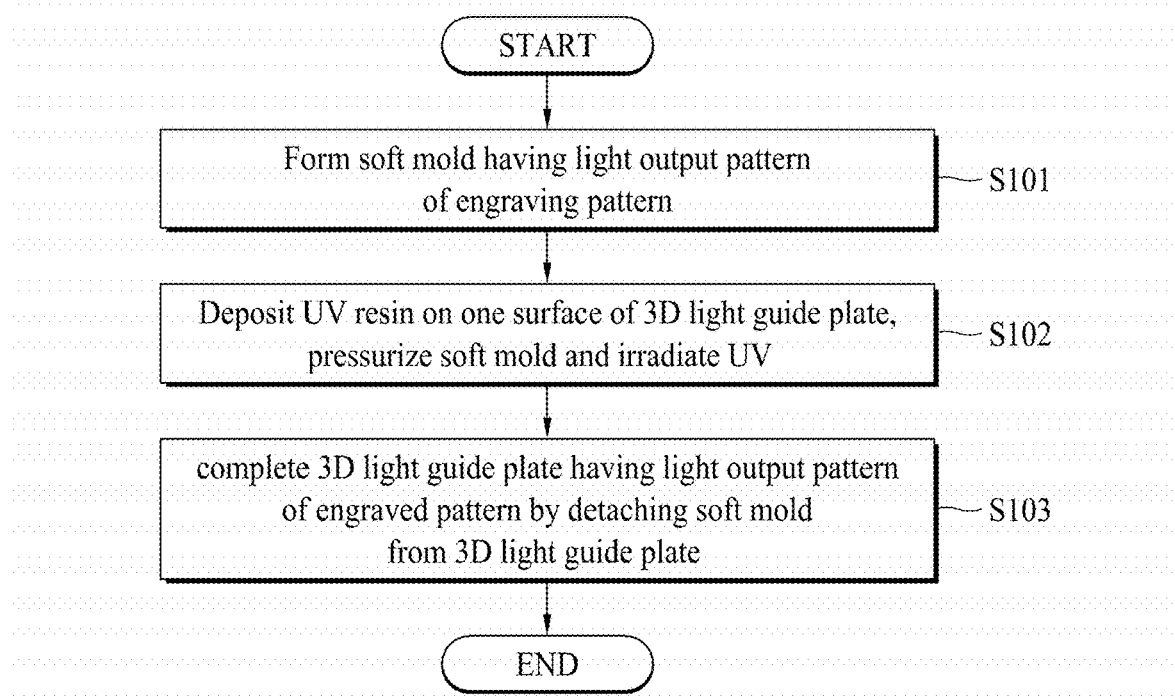
FIG. 14 is a flow chart illustrating a method for manufacturing a 3D light guide plate according to an embodiment of the present invention.

FIG. 14 is a flow chart illustrating a method for manufacturing a 3D light guide plate according to an embodiment of the present invention. FIGS. 15A to 15F are exemplary views illustrating the method for manufacturing a 3D light guide plate according to the embodiment of the present invention. Hereinafter, a method for manufacturing a 3D light guide plate in which the first light output patterns 211a are formed on a lower surface of the 3D light guide plate as shown in FIGS. 4A and 4B will be described in detail with reference to FIGS. 14 and 15A to 15F.

First of all, a soft mold 311 provided with light output patterns 311a of an engraving pattern is formed to form a 3D light guide plate 211 below which first light output patterns 211a of an engraved pattern are formed.

Figure 15A:
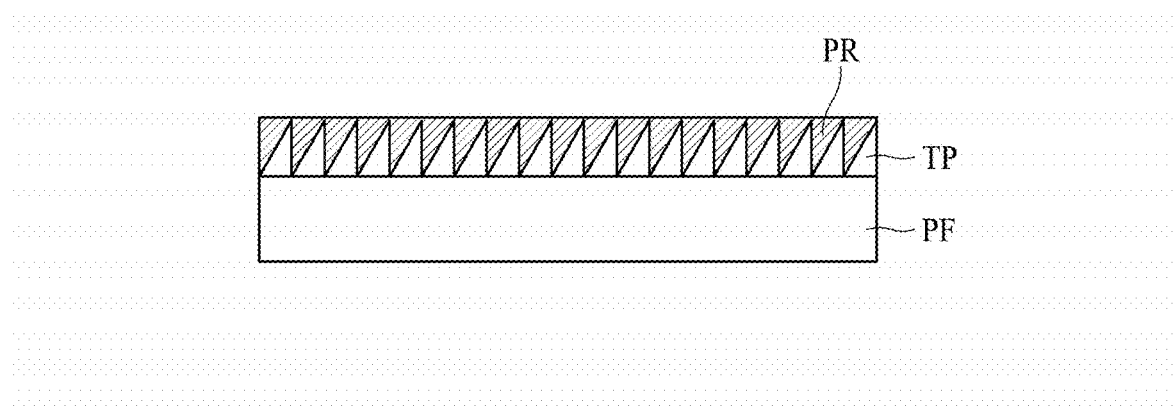
FIGS. 15A to 15F are exemplary views illustrating the method for manufacturing a 3D light guide plate of FIG. 14 according to an embodiment of the present invention.
Figure 15B:
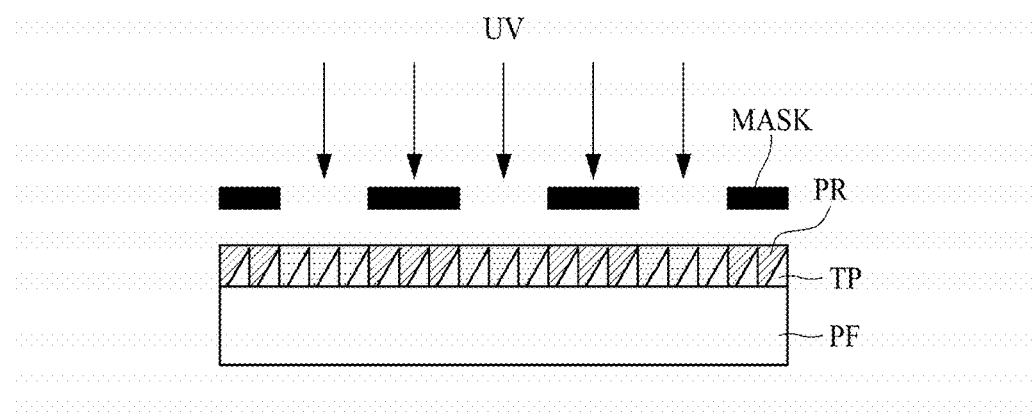
Figure 15C:
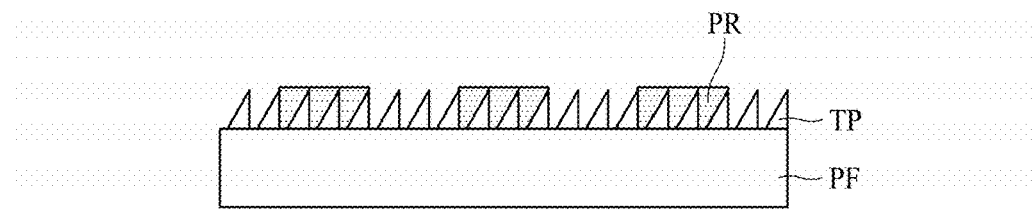
Figure 15D:
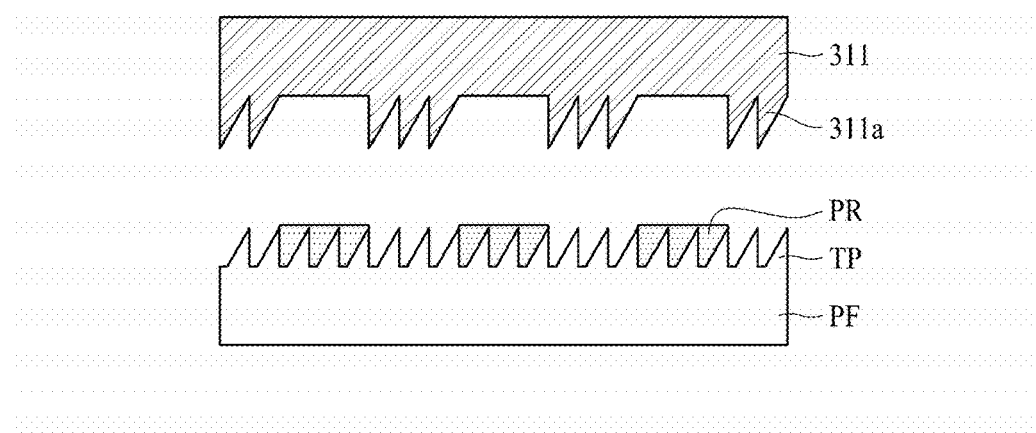
Figure 15E:
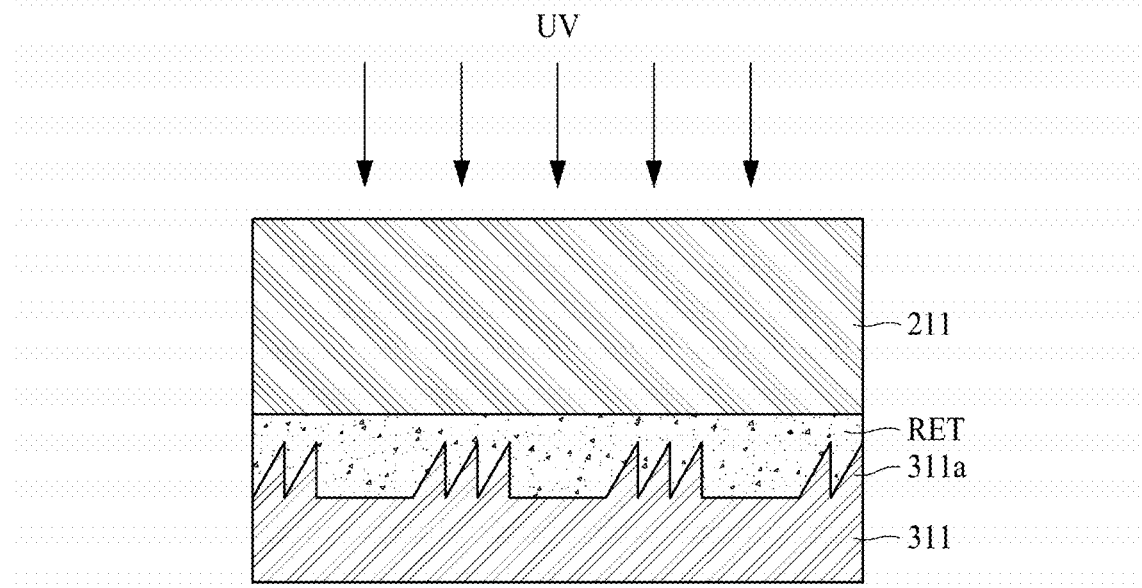
Figure 15F:
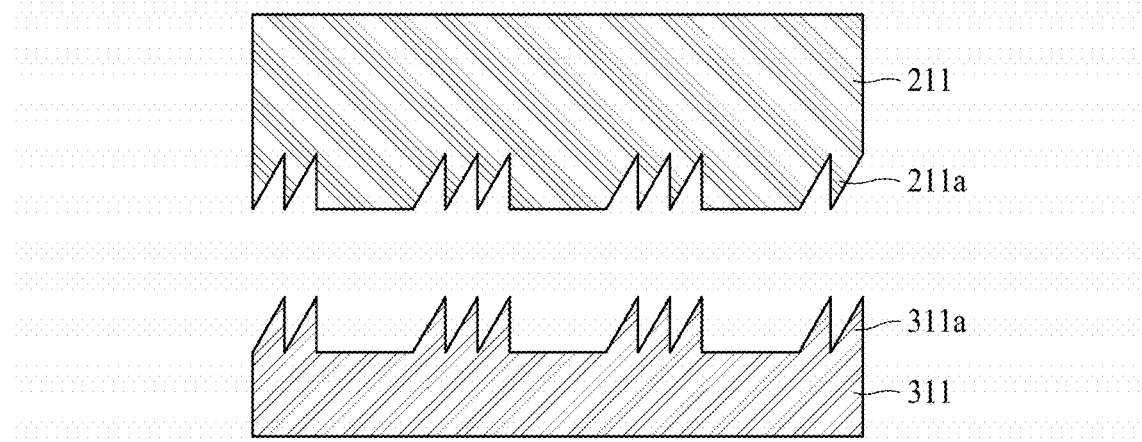

In more detail, as shown in FIG. 15A, a photoresist pattern PR is deposited on a plastic film PF on which triangular prisms TP are formed. Then, as shown in FIG. 15B, a mask MASK is arranged on the plastic film PF, and the photoresist pattern PR is removed by exposure to UV rays. For this reason, as shown in FIG. 15C, triangular prisms TP are exposed to the areas where the photoresist pattern PR is removed from the plastic film PF, and are covered by the photoresist pattern PR at the other areas. As shown in FIG. 15D, the soft mold 311 is pressurized by the plastic film PF, whereby the soft mold 311 that includes the light output patterns 311a of the engraving pattern is formed (S101 of FIG. 14).

Secondly, a UV hardening resin (RES) is deposited on one surface of the 3D light guide plate 211, the soft mold 311 is pressurized, and UV is irradiated (S102 of FIG. 14).

Thirdly, if the UV hardening resin is completely hardened, the soft mold 311 is detached from the 3D light guide plate 211. The light output patterns 311a of the engraving pattern of the soft mold 311 are formed on one surface of the 3D light guide plate 211 as an engraved pattern. That is, the 3D light guide plate 211 having the light output patterns 211a of the engraved pattern is completed (S103 of FIG. 14).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A backlight unit comprising:
   a 3D (three-dimensional) light guide plate including first light output patterns to output light;
   first light sources irradiating light to at least one side of the 3D light guide plate;
   a 2D (two-dimensional) light guide plate arranged below the 3D light guide plate and including second light output patterns to output light; and
   second light sources irradiating light to at least one side of the 2D light guide plate,
   wherein the first light output patterns are a plurality of line prism patterns spaced apart from each other,
   wherein the first light output patterns are aligned and overlapped with some of the second light output patterns,
   wherein each of the plurality of line prism patterns of the first light output patterns includes a plurality of triangular prisms extending in an alignment direction of the first light sources,
   wherein the plurality of line prism patterns of the first light output patterns are arranged in an extending direction crossing the alignment direction of the first light sources, and
   wherein the plurality of line prism patterns of the first light output patterns arranged in the extending direction are inclined at a predetermined angle greater than zero with respect to one side of the 3D light guide plate that is perpendicular to the alignment direction of the first light sources.

2. The backlight unit of claim 1, wherein a short side of each of the plurality of line prism patterns is parallel with the alignment direction of the first light sources, and a long side thereof crosses the alignment direction of the first light sources.

3. The backlight unit of claim 2, wherein the long side of each of the line prism patterns is inclined at the predetermined angle with respect to the one side of the 3D light guide plate.

4. The backlight unit of claim 1, wherein a width of each of the plurality of line prism patterns is widened toward a center of the 3D light guide plate from both sides of the 3D light guide plate if the first light sources are arranged at both sides of the 3D light guide plate.

5. The backlight unit of claim 1, wherein a width of each of the line prism patterns is widened toward another side of the 3D light guide plate that faces the one side of the 3D light guide plate if the first light sources are arranged at the one side of the 3D light guide plate.

6. The backlight unit of claim 1, wherein the plurality of line prism patterns are formed on a lower surface of the 3D light guide plate as an engraved pattern.

7. The backlight unit of claim 1, wherein the 3D light guide plate includes:
   a light guide plate including the plurality of line prism patterns formed on an upper surface of the light guide plate as an engraved pattern; and
   a light emitting layer arranged on the light guide plate, wherein the light emitting layer has a refractive index greater than that of the light guide plate.

8. The backlight unit of claim 1, wherein the 3D light guide plate includes:
   a light guide plate; and
   a light emitting layer arranged on the light guide plate and including the plurality of line prism patterns disposed on an upper surface of the light guide plate and formed on a surface of the light emitting layer as an engraved pattern,
   wherein the light emitting layer has a refractive index smaller than that of the light guide plate, and
   wherein air is filled between the light guide plate and each of the plurality of line prism patterns of the light emitting layer.

9. The backlight unit of claim 1, further comprising an optical sheet to distribute the light from the 2D light guide plate, and arranged between the 3D light guide plate and the 2D light guide plate.

10. An autostereoscopic 3D (three-dimensional) display device comprising:
    a display panel; and
    a backlight unit irradiating light to the display panel,
    wherein the backlight unit includes:
    a 3D (three-dimensional) light guide plate including first light output patterns to output light;
    first light sources irradiating light to at least one side of the 3D light guide plate;
    a 2D (two-dimensional) light guide plate arranged below the 3D light guide plate and including second light output patterns to output light; and
    second light sources irradiating light to at least one side of the 2D light guide plate,
    wherein the first light output patterns are a plurality of line prism patterns spaced apart from each other, and
    wherein the first light output patterns are aligned and overlapped with some of the second light output patterns,
    wherein each of the plurality of line prism patterns of the first light output patterns includes a plurality of triangular prisms extending in an alignment direction of the first light sources, wherein the plurality of line prism patterns of the first light output patterns are arranged in an extending direction crossing the alignment direction of the first light sources, and wherein the plurality of line prism patterns of the first light output patterns arranged in the extending direction are inclined at a predetermined angle greater than zero with respect to one side of the 3D light guide plate that is perpendicular to the alignment direction of the first light sources.

11. The autostereoscopic 3D display device of claim 10, wherein only the first light sources emit the light in a 2D mode in which pixels of the display panel display a 2D image through 2D image data, and only the second light sources emit the light in a 3D mode in which pixels of the display panel display a 3D image through 3D image data.

12. The autostereoscopic 3D display device of claim 11, wherein in the 2D mode, the backlight unit emits uniform surface light to the display panel when the second light sources irradiate light, and wherein in the 3D mode, areas between the first light output patterns serve as barriers to light emission.

13. The autostereoscopic 3D display device of claim 10, wherein a short side of each of the plurality of line prism patterns is parallel with the alignment direction of the first light sources, and a long side thereof crosses the alignment direction of the first light sources.

14. The autostereoscopic 3D display device of claim 13, wherein the long side of each of the plurality of line prism patterns is inclined at the predetermined angle with respect to the one side of the 3D light guide plate.

15. The autostereoscopic 3D display device of claim 10, wherein a width of each of the plurality of line prism patterns is widened toward a center of the 3D light guide plate from both sides of the 3D light guide plate if the first light sources are arranged at both sides of the 3D light guide plate.

16. The autostereoscopic 3D display device of claim 10, wherein a width of each of the plurality of line prism patterns is widened toward another side of the 3D light guide plate that faces the one side of the 3D light guide plate if the first light sources are arranged at the one side of the 3D light guide plate.

17. The autostereoscopic 3D display device of claim 10, wherein the plurality of line prism patterns are formed on a lower surface of the 3D light guide plate as an engraved pattern.

18. The autostereoscopic 3D display device of claim 10, wherein the 3D light guide plate includes:

a light guide plate including the plurality of line prism patterns formed on an upper surface of the light guide plate as an engraved pattern; and a light emitting layer arranged on the light guide plate, wherein the light emitting layer has a refractive index greater than that of the light guide plate.

19. The autostereoscopic 3D display device of claim 10, wherein the 3D light guide plate includes:

a light guide plate; and a light emitting layer arranged on the light guide plate and including the plurality of line prism patterns disposed on an upper surface of the light guide plate and formed on a surface of the light emitting layer as an engraved pattern, wherein the light emitting layer has a refractive index smaller than that of the light guide plate, and wherein air is filled between the light guide plate and each of the plurality of line prism patterns of the light emitting layer.

* * * * *